US012785499B2

(12) United States Patent
Ogawa et al.

(10) Patent No.: US 12,785,499 B2
(45) Date of Patent: Nov. 3, 2026

(54) COMPRESSOR AND REFRIGERATION DEVICE

(71) Applicant: DAIKIN INDUSTRIES, LTD., Osaka (JP)

(72) Inventors: Ayumi Ogawa, Osaka (JP); Tatsuya Ogawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/963,420

(22) Filed: Nov. 27, 2024

(65) Prior Publication Data

US 2025/0096640 A1 Mar. 20, 2025

Related U.S. Application Data

(63) Continuation of application No. PCT/JP2023/017765, filed on May 11, 2023.

(30) Foreign Application Priority Data

Jun. 9, 2022 (JP) ................................ 2022-093946

(51) Int. Cl.
*H02K 7/04* (2006.01)
*F04B 39/02* (2006.01)
*H02K 7/14* (2006.01)

(52) U.S. Cl.
CPC .......... *H02K 7/04* (2013.01); *F04B 39/0238* (2013.01); *H02K 7/14* (2013.01); *F04C 2240/807* (2013.01); *H02K 2205/09* (2013.01)

(58) Field of Classification Search
CPC ........ H02K 7/04; H02K 7/14; H02K 2205/09; F04C 18/0215; F04C 18/356; F04C 29/06;
(Continued)

(56) References Cited

U.S. PATENT DOCUMENTS

2010/0150752 A1* 6/2010 Nakamura ............ F04C 23/008 417/410.5
2019/0323505 A1* 10/2019 Tatsuwaki ............ F04C 29/028
(Continued)

FOREIGN PATENT DOCUMENTS

CN 209370068 U * 9/2019
CN 112324639 A * 2/2021 ............... H02K 7/02
(Continued)

OTHER PUBLICATIONS

English translation of JP2002317775 (Year: 2025).*
(Continued)

*Primary Examiner* — Dominick L Plakkoottam
(74) *Attorney, Agent, or Firm* — Spencer Fane LLP

(57) ABSTRACT

A compressor includes a casing, a compression mechanism unit provided in the casing, and a motor provided in the casing to drive the compression mechanism unit. The motor include a rotor having a cylindrical shape, and a balance weight provided on an end surface of the rotor in an axial direction and having an annular outer peripheral surface. The balance weight includes an end surface facing the rotor, a recessed portion provided on the end surface, a wall portion provided between the recessed portion and the outer peripheral surface, and a communication path provided on the wall portion and allowing a space of the recessed portion and a space on an outer side of the wall portion in a radial direction to communicate with each other.

11 Claims, 6 Drawing Sheets

(58) Field of Classification Search
CPC .. F04C 23/008; F04C 29/0021; F04C 29/028; F04C 2240/807; F04B 35/04; F04B 39/121; F04B 39/0238
See application file for complete search history.

(56) References Cited

U.S. PATENT DOCUMENTS

| | | | | |
|---|---|---|---|---|
| 2020/0056482 | A1* | 2/2020 | Oren | F01D 5/027 |
| 2021/0254620 | A1* | 8/2021 | Deguchi | F04C 29/02 |
| 2022/0307504 | A1* | 9/2022 | Isome | F04C 23/008 |

FOREIGN PATENT DOCUMENTS

| | | | |
|---|---|---|---|
| JP | 2002317775 | A | * 10/2002 |
| JP | 2014-70586 | A | 4/2014 |
| JP | 2021-17849 | A | 2/2021 |
| JP | 2021-80918 | A | 5/2021 |

OTHER PUBLICATIONS

International Search Report of corresponding PCT Application No. PCT/JP2023/017765 dated Jun. 13, 2023.
International Preliminary Report of corresponding PCT Application No. PCT/JP2023/017765 dated Dec. 19, 2024.

* cited by examiner

COMPRESSOR AND REFRIGERATION DEVICE

CROSS-REFERENCE TO RELATED APPLICATIONS

This is a continuation of International Application No. PCT/JP2023/017765 filed on May 11, 2023, which claims priority under 35 U.S.C. § 119(a) to Patent Application No. 2022-093946, filed in Japan on Jun. 9, 2022, all of which are hereby expressly incorporated by reference into the present application.

BACKGROUND

Technical Field

The present disclosure relates to a compressor and a refrigeration apparatus including the compressor.

Background Art

Examples of a known compressor include a compressor provided with a balance weight provided at a lower end of a rotor, and a cover covering a lower end surface of the rotor and the balance weight (see, for example, JP 2021-17849 A).

In the above-described compressor, the balance weight is covered with the cover to suppress mixing of refrigerant and refrigerating machine oil in the compressor.

SUMMARY

A compressor of a first aspect of the present disclosure includes: a casing; a compression mechanism unit provided in the casing; and a motor that is provided in the casing and drives the compression mechanism unit, in which the motor includes a rotor and a balance weight, the rotor having a cylindrical shape, the balance weight being provided on an end surface of the rotor in an axial direction and having an annular outer periphery, and the balance weight includes an end surface, a recessed portion, a wall portion, and a communication path, the end surface facing the rotor, the recessed portion being provided on the end surface, the wall portion being provided between the recessed portion and the outer periphery, the communication path being provided on the wall portion and allowing a space within the recessed portion and a space outer in a radial direction than the wall portion to communicate with each other.

DETAILED DESCRIPTION OF EMBODIMENT(S)

Figure 1:
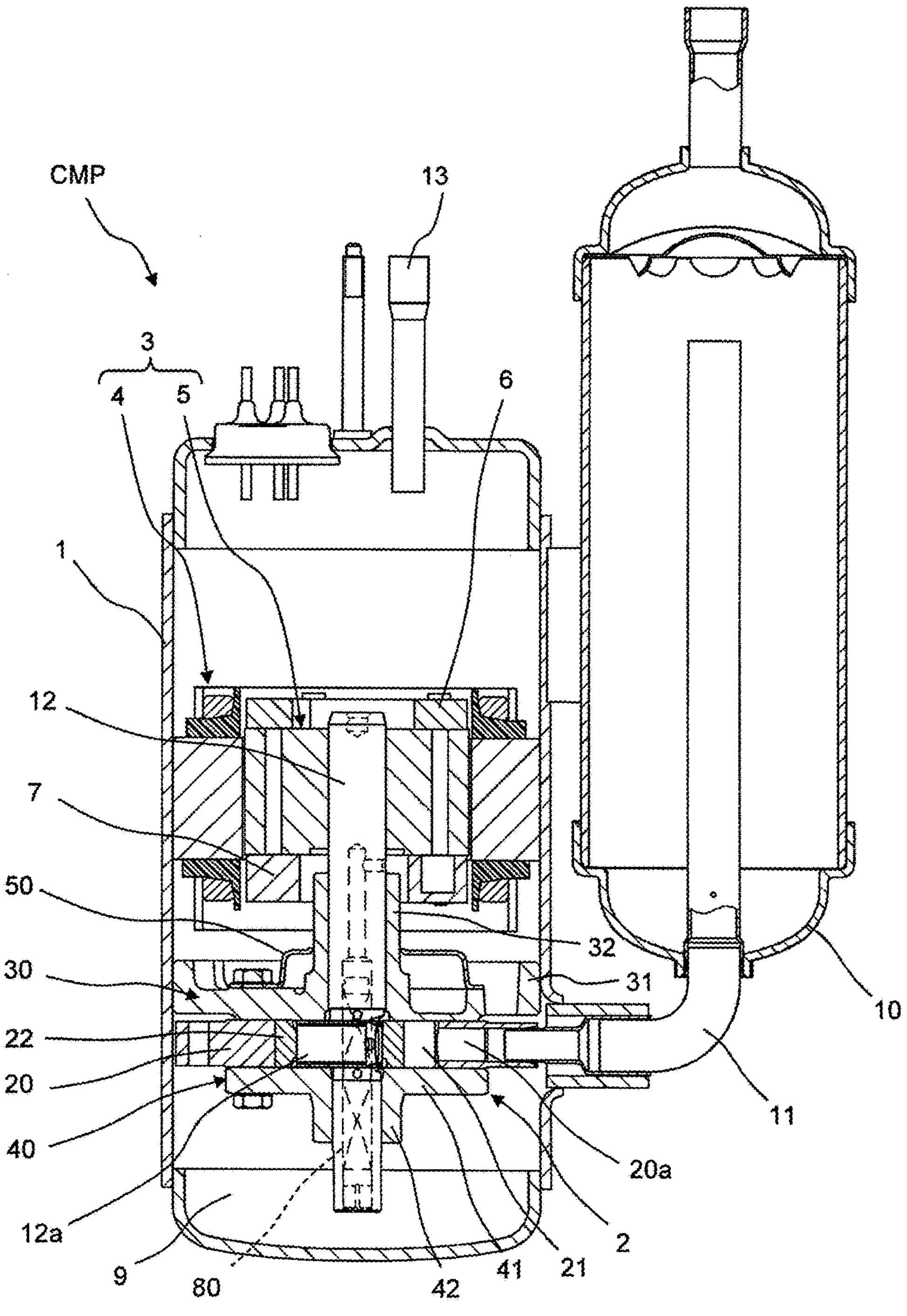
FIG. 1 is a longitudinal cross-sectional view of a compressor of a first embodiment of the present disclosure.

Hereinafter, embodiments will be described. Note that, in the drawings, the same reference numerals represent the same or corresponding parts. In addition, the dimensions on the drawing such as the length, the width, the thickness, and the depth are appropriately changed from the actual scale for clarity and simplification of the drawing, and do not represent the actual relative dimensions.

First Embodiment

FIG. 1 is a longitudinal cross-sectional view of a compressor CMP of a first embodiment of the present disclosure.

As shown in FIG. 1, the compressor CMP of the first embodiment includes a hermetic container 1, a compression mechanism unit 2 disposed in the hermetic container 1, and a motor 3 disposed in the hermetic container 1 and configured to drive the compression mechanism unit 2 via a shaft 12. The hermetic container 1 is an example of a casing.

The compressor CMP is a single-cylinder rotary compressor of a swing piston type. In the compressor CMP, the compression mechanism unit 2 is disposed on a lower side of the hermetic container 1, and the motor 3 is disposed above the compression mechanism unit 2. The motor 3 includes an annular stator 4 fixed inside the hermetic container 1, and a cylindrical rotor 5 disposed inside the stator 4 and fixed to the shaft 12. The rotation of the rotor 5 drives the compression mechanism unit 2 via the shaft 12. The motor 3 is an example of an inner rotor motor.

The compression mechanism unit 2 sucks refrigerant gas from an accumulator 10 through a suction pipe 11. Controlling a condenser, an expansion mechanism, and an evaporator (not shown) that constitute an air conditioner as an example of a refrigeration apparatus together with the compressor CMP generates the refrigerant gas.

The compressor CMP is configured to discharge compressed high-temperature and high-pressure refrigerant gas (gas to be discharged) from the compression mechanism unit 2 to fill the hermetic container 1 with the refrigerant gas and to cause the refrigerant gas to pass through a gap between the stator 4 and the rotor 5 of the motor 3 to cool the motor 3. Furthermore, the compressor CMP is configured such that the refrigerant gas from the gap is discharged to the outside from a discharge pipe 13 provided above the motor 3.

Formed below a high-pressure area in the hermetic container 1 is an oil sump 9 in which a lubricating oil is stored. The lubricating oil moves from the oil sump 9 to a sliding portion of the compression mechanism unit 2 through an oil passage 80 provided in the shaft 12 to lubricate the sliding portion.

The compression mechanism unit 2 includes a front head 30 attached to an inner surface of the hermetic container 1, a cylinder 20 attached to a lower side of the front head 30, and a rear head 40 attached to a lower side of the cylinder 20. The cylinder 20, the front head 30, and the rear head 40 forms a cylinder chamber 21.

The compressor CMP includes a piston 22 formed integrally with a roller and a blade. In the cylinder chamber 21 sandwiched between the front head 30 and the rear head 40, the piston 22 is driven via the shaft 12 to swing. The inner space of the cylinder chamber 21 is partitioned into a high pressure side and a low pressure side by the blade (not shown) of the piston 22.

The front head 30 has a disk-shaped main body 31 and a boss 32 provided at a center of the main body 31 and extending upward. The shaft 12 passes through the main body 31 and the boss 32.

A cup-shaped muffler cover 50 is attached to an upper side of the main body 31 so as to cover a discharge valve (not shown). This muffler cover 50 is fixed to the main body 31 with a bolt or the like. The boss 32 passes through the muffler cover 50. The muffler cover 50 and the front head 30 form a muffler chamber.

The rear head 40 has a disk-shaped main body 41 and a boss 42 provided at a center of the main body 41 and extending downward. The shaft 12 passes through the main body 41 and the boss 42.

The shaft 12 has one end rotatably supported by a bearing of the front head 30 and a bearing of the rear head 40. The shaft 12 has one end (supported end side) extending into the cylinder chamber 21.

On the supported end side of the shaft 12, an eccentric portion **12*a* is provided so as to be located in the cylinder chamber 21 of the compression mechanism unit 2. This eccentric portion 12*a* of the shaft 12 is fitted to the roller of the piston 22. This piston 22 is disposed revolvable in the cylinder chamber 21, and the revolving motion of the piston 22** causes a compression action.

In the compression mechanism unit 2, the rear head 40, the cylinder 20, and the front head 30 are placed on top of each other in this order, and the rotation of the shaft 12 having the eccentric portion **12*a* causes the piston 22 to circle along the inner peripheral surface of the cylinder chamber 21 formed in the cylinder 20. The refrigerant gas is sucked into the cylinder chamber 21 through a suction port 20*a* provided in the cylinder 20 by the circling motion of the piston 22, compressed in the cylinder chamber 21, and then discharge into the hermetic container 1** through a discharge port (not shown).

A first balance weight 6 is further provided on an upper end surface (one end surface in the axial direction) of the rotor 5. On the other hand, a second balance weight 7 is provided on a lower end surface (the other end surface in the axial direction) of the rotor 5. The first and second balance weights 6 and 7 are fastened to the rotor 5 by rivets (not shown). The first balance weight 6 is in close contact with the upper end surface of the rotor 5, and the second balance weight 7 is in close contact with the lower end surface of the rotor 5. The second balance weight 7 is an example of the balance weight of the present disclosure.

The first and second balance weights 6 and 7 reduce the imbalance of the shaft 12 caused by the eccentric portion **12*a*. The first and second balance weights 6 and 7 include sintered metal, and each include an integrated cover and balance weight. For example, the first and second balance weights 6 and 7** may be manufactured by another method such as casting or machining.

First Balance Weight 6

The first balance weight 6 is similar in configuration to the second balance weight 7 except for a communication path, and is smaller in size than the second balance weight 7.

Second Balance Weight 7

Figure 2:
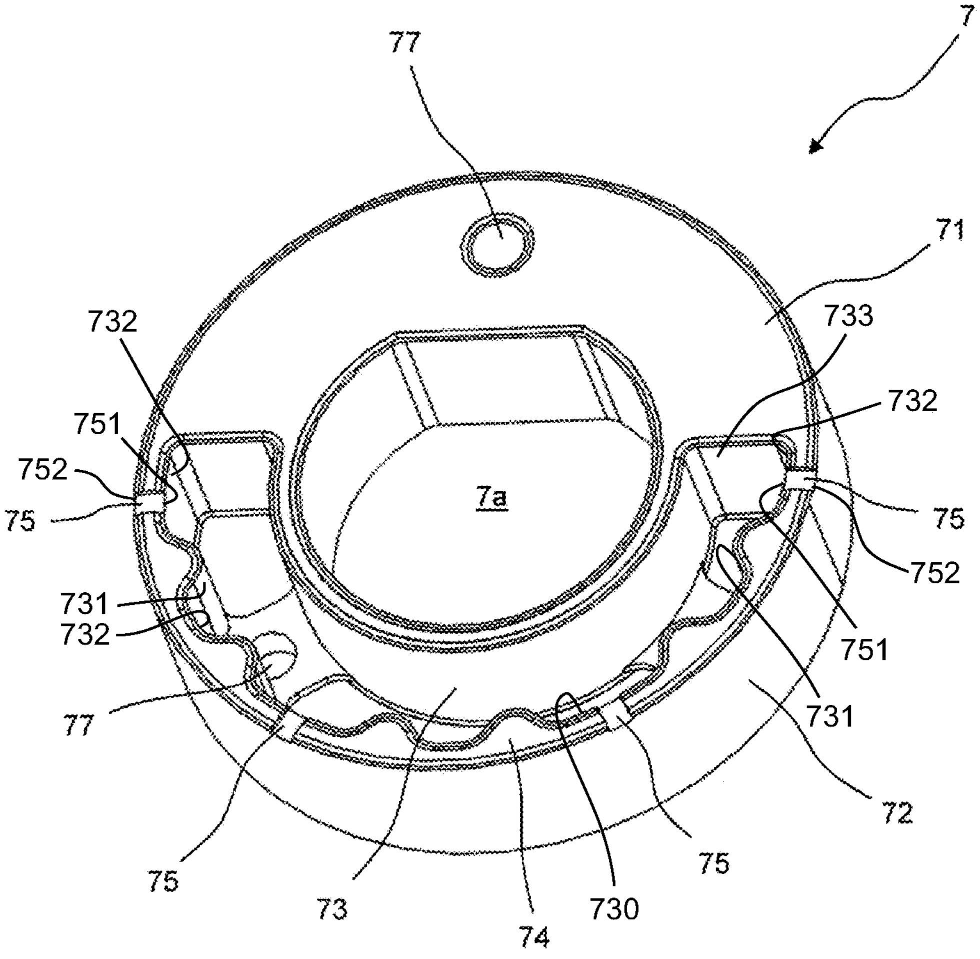
FIG. 2 is a perspective view of a second balance weight of the compressor of the first embodiment.
Figure 3:
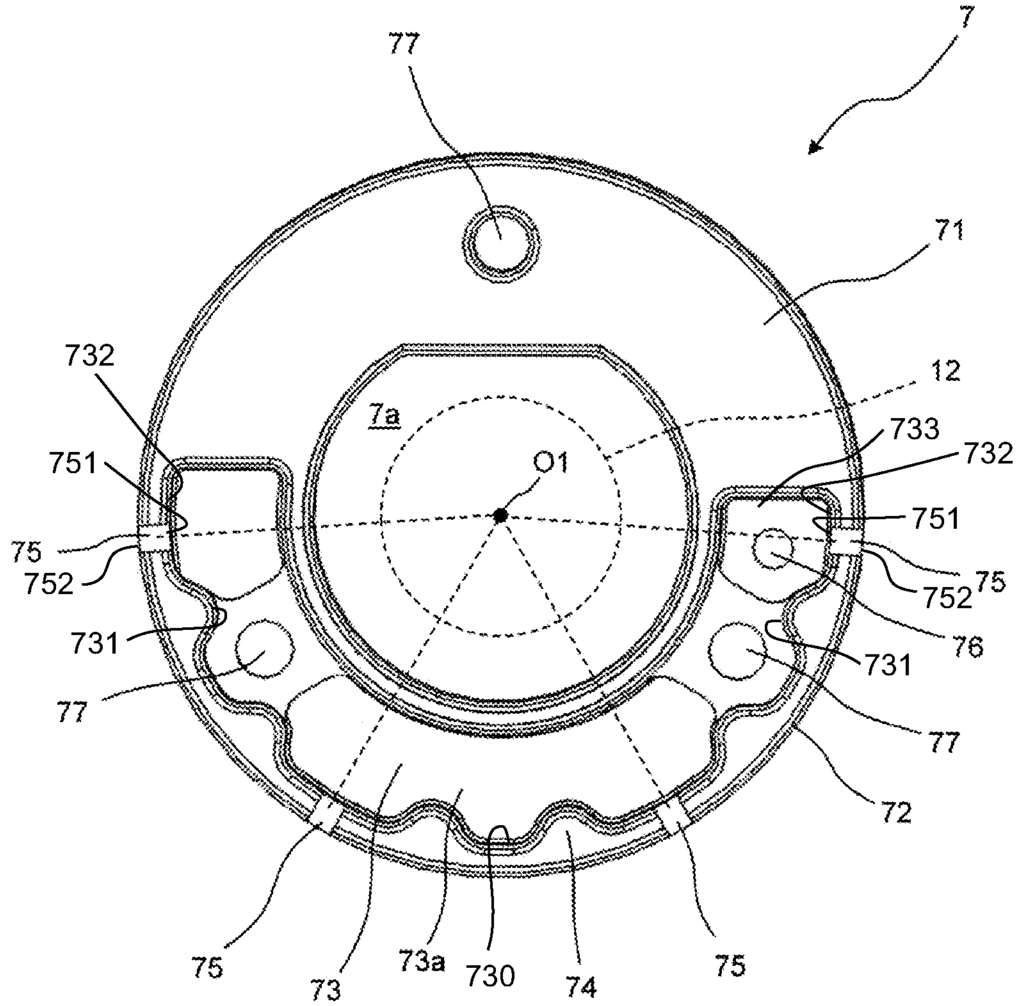
FIG. 3 is a top view of the second balance weight of the compressor of the first embodiment.

FIG. 2 is a perspective view of the second balance weight 7, and FIG. 3 is a top view of the second balance weight 7. In FIGS. 2 and 3, a reference numeral **7*a* denotes a through hole with a large diameter through which the shaft 12 passes, and a reference numeral 77** denotes a through hole with a small diameter through which the rivet (not shown) passes.

As shown in FIGS. 2 and 3, the second balance weight 7 includes an end surface 71 facing the rotor 5, an annular outer peripheral surface 72, a recessed portion 73 provided on the end surface 71, a wall portion 74 provided between the recessed portion 73 and the annular outer peripheral surface 72, and a plurality of grooves 75 provided at an upper end of the wall portion 74, the plurality of grooves 75 serving as communication paths that allow a space within the recessed portion 73 and a space outer in a radial direction than the wall portion 74 to communicate with each other.

The plurality of grooves 75 are formed on the wall portion 74 of the second balance weight 7 radially about a center axis O1 of the rotor 5. Each of the grooves 75 extend continuously in the radial direction from a radially inner opening 751 that opens to the space of the recessed portion 73 to a radially outer opening 752 that opens to the space on the outer side of the wall portion 74.

The recessed portion 73 of the second balance weight 7 has a drain hole 76 formed in a bottom **73*a* of the recessed portion 73. The recessed portion 73 includes a radially outward surface 730 including convex surfaces 731 and concave surfaces 732 adjacent to the convex surfaces 731 in a circumferential direction. The concave surfaces 732 are located radially outward relative to the convex surfaces 731. The radially inner openings 751 are connected with the concave surfaces 732, and the radially outer openings 752 are connected with the annular outer peripheral surface 72 of the balance weight 7. At least one of the concave surfaces 732 (e.g., two in the illustrated embodiment) is provided at a circumferential end portion 733 of the radially outward surface 730**.

In a compressor having a configuration where a balance weight is covered with a cover (for example, the compressor disclosed in JP 2021-17849 A), the cover is attached with the balance weight sandwiched between an end surface of the rotor and the cover, so that a gap is formed between the end surface of the rotor and the cover through which refrigerating machine oil flows out, which prevents the refrigerating machine oil from collecting in the cover. On the other hand, a compressor with an integrated balance weight and cover has a configuration where an end surface of the rotor and the balance weight (including the cover, i.e., serving as the cover) are in contact with each other without a gap, so that the refrigerating machine oil tends to collect in the space of the recessed portion of the balance weight, which makes the rotor unbalanced and increases vibrations accordingly.

In order to solve such a problem, the compressor CMP according to the present disclosure includes the plurality of grooves 75 (communication paths) that allow the space defined by the recessed portion 73 of the second balance weight 7 and the space outside in the radial direction with respect to the wall portion 74 to communicate with each other. This allows the refrigerating machine oil collected in the space (cavity) of the recessed portion 73 of the second balance weight 7 to flow out of the second balance weight 7. It is therefore possible to suppress vibrations of the compressor CMP.

For example, in the first embodiment described above, the plurality of grooves 75 (communication paths) that allow the space of the recessed portion 73 and the space on the outer side of the wall portion 74 in the radial direction to communicate with each other are provided on the second balance weight 7, but similar communication paths may be provided on the first balance weight 6.

It is possible to cause, by forming the plurality of grooves 75 (the plurality of paths) as communication paths on the wall portion 74 of the second balance weight 7 radially around the center axis O1 of the rotor 5, the refrigerating machine oil collected in the space (cavity) of the recessed portion 73 of the second balance weight 7 to effectively flow out by centrifugal force of the rotor.

It is possible to easily form, by providing the grooves 75 at the upper end of the wall portion 74 of the second balance weight 7, communication paths that allow the space of the recessed portion 73 of the second balance weight 7 and the space on the outer side of the wall portion 74 in the radial direction to communicate with each other. Providing the grooves 75 at the upper end of the wall portion 74 of the second balance weight 7 by molding using a mold makes the formation of the communication paths simple as compared with providing a through hole in the wall portion 74.

For example, the through hole as a communication path may be provided in the wall portion 74 of the second balance weight 7.

It is possible to cause, by providing the drain hole 76 in the bottom of the recessed portion 73 of the second balance weight 7, the refrigerating machine oil collected by its own weight at the bottom 73*a* of the recessed portion 73 of the second balance weight 7 to flow out efficiently. For example, when the refrigerating machine oil can be sufficiently drained through the communication paths, the drain hole 76 need not be provided.

Figure 4:
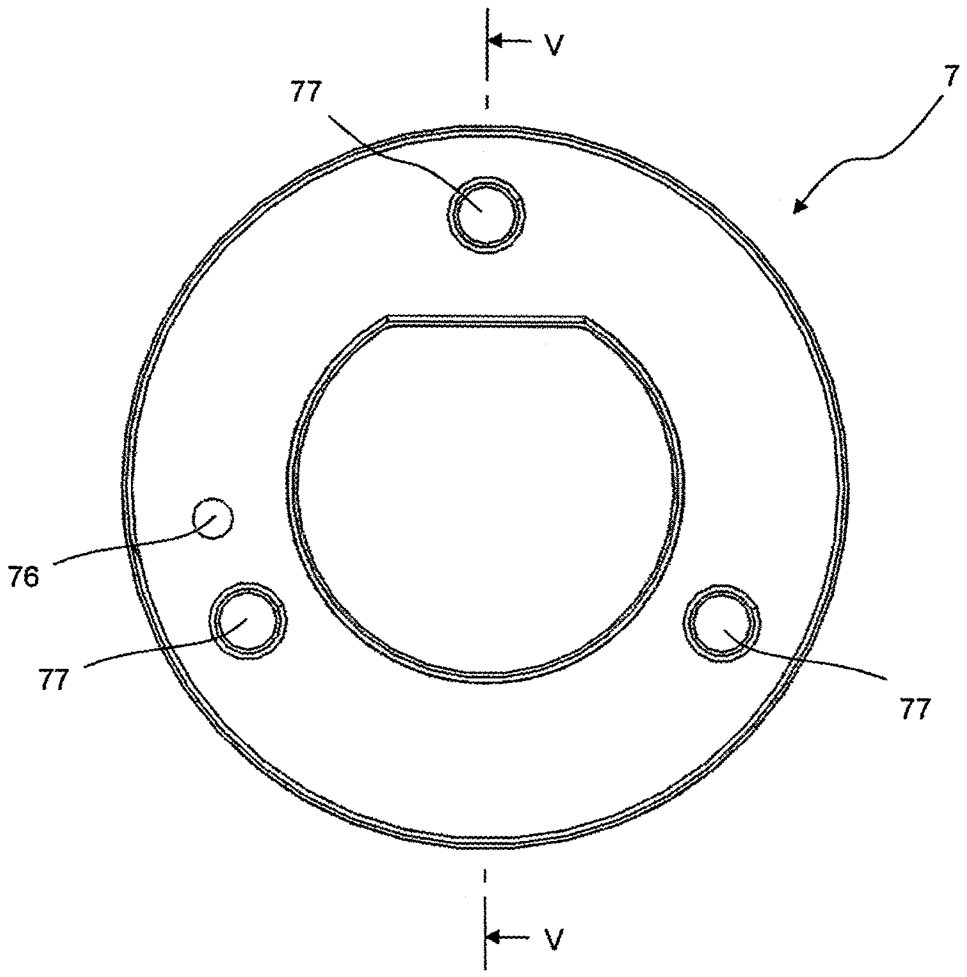
FIG. 4 is a bottom view of the second balance weight of the compressor of the first embodiment.
Figure 5:
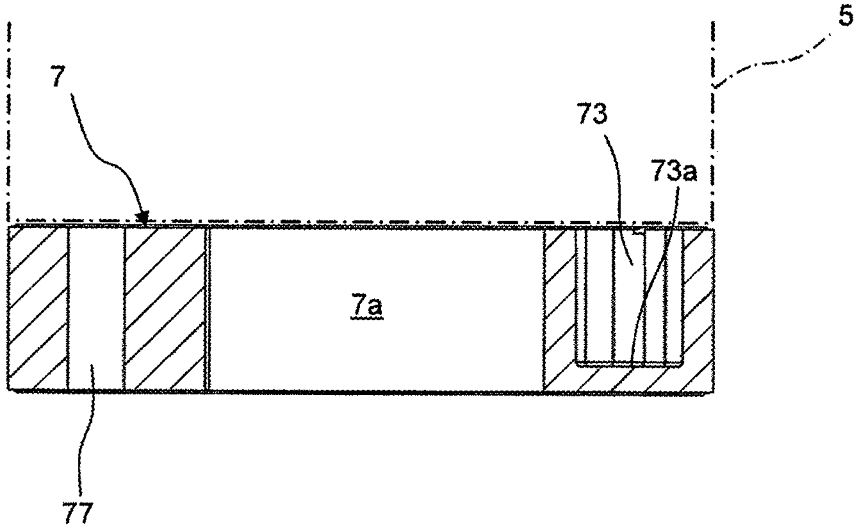
FIG. 5 is a cross-sectional view taken along line V-V in FIG. 4.

FIG. 4 is a bottom view of the second balance weight 7, and FIG. 5 is a cross-sectional view taken along line V-V in FIG. 4.

For example, in the first embodiment, the plurality of grooves 75 serving as communication paths are provided on the wall portion 74 of the second balance weight 7, but the communication paths may be through holes provided in the wall portion of the balance weight.

Second Embodiment

Figure 6:
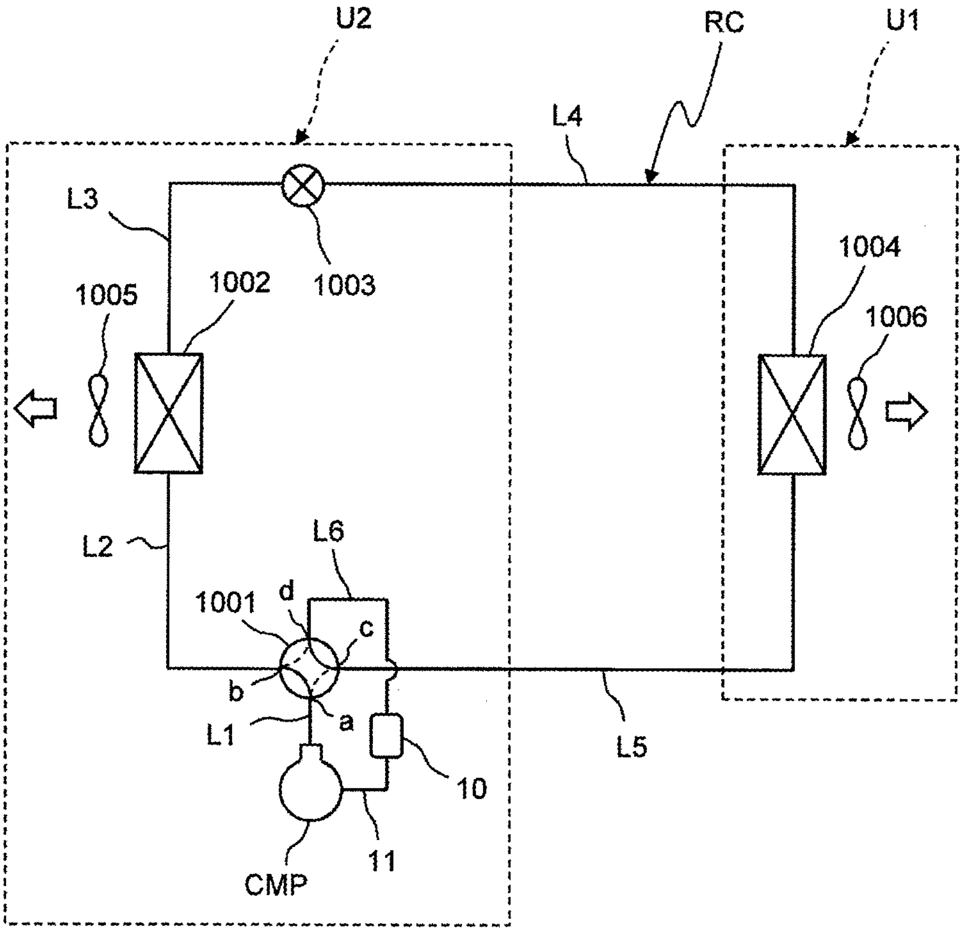
FIG. 6 is a circuit diagram of an air conditioner as an example of a refrigeration apparatus including a refrigerant circuit using a compressor of a second embodiment of the present disclosure.

FIG. 6 is a circuit diagram of an air conditioner as an example of a refrigeration apparatus including a refrigerant circuit RC using a compressor CMP of a second embodiment of the present disclosure.

As shown in FIG. 6, the air conditioner of the second embodiment includes an indoor unit U1 installed in an indoor space to be air-conditioned and an outdoor unit U2 installed outdoors.

Configuration of Indoor Unit U1

The indoor unit U1 of the air conditioner includes an indoor heat exchanger 1004 having one end connected to a refrigerant pipe L4 (connection pipe) and the other end connected to a refrigerant pipe L5 (connection pipe), and an indoor fan 1006 that supplies air to the indoor heat exchanger 1004. The indoor fan 1006 blows out, toward the indoor space, air having temperature or the like adjusted by the indoor heat exchanger 1004.

Configuration of Outdoor Unit U2

The outdoor unit U2 of the air conditioner includes the compressor CMP, a four-way switching valve 1001, an outdoor heat exchanger 1002, an expansion valve 1003 as an example of an expansion mechanism, the accumulator 10, and an outdoor fan 1005 that sends air to the outdoor heat exchanger 1002.

The compressor CMP has a discharge side connected to a first port a of the four-way switching valve 1001 via a refrigerant pipe L1. The four-way switching valve 1001 has a second port b connected to one end of the outdoor heat exchanger 1002 via a refrigerant pipe L2. The outdoor heat exchanger 1002 has the other end connected to one end of the expansion valve 1003 via a refrigerant pipe L3, and the expansion valve 1003 has the other end connected to one end of the refrigerant pipe LA (connection pipe). The refrigerant pipe L5 (connection pipe) has one end connected to a third port c of the four-way switching valve 1001. The four-way switching valve 1001 has a fourth port d connected to a suction side of the compressor CMP via a refrigerant pipe L6, the accumulator 10, and the suction pipe 11.

The refrigerant flowing through the outdoor heat exchanger 1002 exchanges heat with air sucked by the outdoor fan 1005.

The expansion valve 1003 is, for example, an electric valve whose opening degree is adjustable, and the opening degree changes according to a signal from a control device (not shown).

Configuration of Refrigerant Circuit RC

Furthermore, the refrigerant circuit RC of the air conditioner includes the indoor heat exchanger 1004, the compressor CMP, the four-way switching valve 1001, the outdoor heat exchanger 1002, the expansion valve 1003, the accumulator 10, the refrigerant pipes L1 to L6, and the suction pipe 11. This configures an annular refrigerant circuit RC.

As shown in FIG. 6, the four-way switching valve 1001 is switched to a switching position indicated by the solid line for cooling operation and is switched to a switching position indicated by the dotted line for heating operation to drive the compressor CMP, thereby causing the refrigerant to circulate through the refrigerant circuit RC.

According to the air conditioner having the above configuration, it is possible to achieve, by providing the refrigerant circuit RC using the compressor CMP, an air conditioner with suppressed compressor vibrations.

In the second embodiment, the air conditioner has been described as the refrigeration apparatus, but the refrigeration apparatus including the refrigerant circuit RC using the compressor CMP is not limited to the air conditioner, and may be a refrigeration apparatus having another configuration.

In the first and second embodiments, the single-cylinder rotary compressor has been described, but the present disclosure may be applied to a compressor having another configuration such as a two-cylinder rotary compressor or a swing compressor.

The foregoing description concerns specific embodiments of the present disclosure; however, the present disclosure is not limited to the first and second embodiments, and various modifications and variations may be made within the scope of the present disclosure.

The invention claimed is:

1. A compressor comprising:
- a casing;
- a compression mechanism unit provided in the casing; and
- a motor provided in the casing to drive the compression mechanism unit,
- the motor including
  - a rotor having a cylindrical shape, and
  - a balance weight provided on an end surface of the rotor in an axial direction and having an annular outer peripheral surface, and
- the balance weight including
  - an end surface facing the rotor,
  - a recessed portion provided on the end surface,
  - a wall portion provided between the recessed portion and the outer peripheral surface, and
  - a communication path provided on the wall portion and allowing a space of the recessed portion and a space on an outer side of the wall portion in a radial direction to communicate with each other through the communication path, the communication path including at least one groove being provided at an upper end of the wall portion, the at least one groove extending continuously in the radial direction from a radially inner opening that opens to the space of the recessed portion to a radially outer opening that opens to the space on the outer side of the wall portion.

2. The compressor according to claim 1, wherein the communication path includes a plurality of paths formed on the wall portion of the balance weight radially around a center axis of the rotor.

3. The compressor according to claim 1, wherein a drain hole is provided in a bottom of the recessed portion of the balance weight.

4. The compressor according to claim 3, wherein the drain hole is adjacent to the communication path in the radial direction.

5. The compressor according to claim 4, wherein the recessed portion has an arc shape in a plan view, and the drain hole is provided at a circumferential end portion of the bottom.

6. The compressor according to claim 3, wherein the recessed portion has an arc shape in a plan view, and the drain hole is provided at a circumferential end portion of the bottom.

7. A refrigeration apparatus including a refrigerant circuit using a compressor according to claim 1.

8. The compressor according to claim 1, wherein the balance weight is disposed below the rotor.

9. The compressor according to claim 1, wherein the recessed portion includes a radially outward surface including a convex surface and a concave surface being adjacent to the convex surface in a circumferential direction, the concave surface being located radially outward relative to the convex surface.

10. The compressor according to claim 9, wherein the radially inner opening is connected with the concave surface, and the radially outer opening is connected with the annular outer peripheral surface of the balance weight.

11. The compressor according to claim 10, wherein the concave surface is provided at a circumferential end portion of the radially outward surface.

* * * * *